US011948273B2

(12) United States Patent
Kimura (10) Patent No.: US 11,948,273 B2
(45) Date of Patent: Apr. 2, 2024

(54) IMAGE PROCESSING METHOD, STORAGE MEDIUM, IMAGE PROCESSING APPARATUS, TRAINED MODEL PRODUCING METHOD, LEARNING METHOD, LEARNING APPARATUS, AND IMAGE PROCESSING SYSTEM

(71) Applicant: CANON KABUSHIKI KAISHA, Tokyo (JP)

(72) Inventor: Yoshinori Kimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 17/480,641

(22) Filed: Sep. 21, 2021

(65) Prior Publication Data

US 2022/0101493 A1  Mar. 31, 2022

(30) Foreign Application Priority Data

Sep. 30, 2020 (JP) ................................. 2020-164699

(51) Int. Cl.
*G06T 3/00* (2006.01)
*G06N 3/08* (2023.01)
*G06T 3/4046* (2024.01)
*G06T 3/4053* (2024.01)

(52) U.S. Cl.
CPC ............ *G06T 3/4046* (2013.01); *G06N 3/08* (2013.01); *G06T 3/4053* (2013.01)

(58) Field of Classification Search
CPC ....... G06T 3/4046; G06T 3/4053; G06T 1/20; G06N 3/08
See application file for complete search history.

(56) References Cited

U.S. PATENT DOCUMENTS

2012/0113119 A1* 5/2012 Massie .................. G06T 3/4053
345/428
2020/0285883 A1* 9/2020 Hiasa ...................... G06T 5/002

FOREIGN PATENT DOCUMENTS

CN        111325692 A  *  6/2020  ........... G06T 3/4046
CN        111696034 B  * 10/2023  ........... G06T 3/4046
WO     2019/091459 A1      5/2019

OTHER PUBLICATIONS

Xintao Wang, ESRGAN: Enhanced Super-Resolution Generative Adversarial Networks, Sep. 2018, pp. 1-23, web, http://arxiv.org/abs/1809.00219.
Aaron Defazio, et al., MRI Banding Removal via Adversarial Training, arXiv:2001.08699v1 [eess.IV] Jan. 23, 2020, XP81584591A1.
Lale Akarun, et al., Adaptive Methods for Dithering Color Images, IEEE Transactions on Image Processing, vol. 6, No. 7, Jul. 1997, XP11026170A1.

* cited by examiner

*Primary Examiner* — Ping Y Hsieh
(74) *Attorney, Agent, or Firm* — Canon U.S.A., Inc. IP Division (57) ABSTRACT

An image processing method includes generating a second image by applying noise to a first image, as a first process, and generating a third image by upsampling the second image through a neural network, as a second process. The second image is generated by applying noise to the first image expressed in a second bit depth higher than a first bit depth of the first image and then restoring the bit depth to the first bit depth.

13 Claims, 10 Drawing Sheets

IMAGE PROCESSING METHOD, STORAGE MEDIUM, IMAGE PROCESSING APPARATUS, TRAINED MODEL PRODUCING METHOD, LEARNING METHOD, LEARNING APPARATUS, AND IMAGE PROCESSING SYSTEM

BACKGROUND OF THE INVENTION

Field of the Invention

The present invention relates to image processing using machine learning.

Description of the Related Art

In recent years, techniques using deep learning (hereinafter also referred to as DL) for super-resolution processing have attracted attention.

A super-resolution image processing method using DL is disclosed in Xintao Wang, et al., "ESRGAN: Enhanced super-resolution generative adversarial networks" (arXiv: 1809.00219, 2018).

In the method by Xintao Wang et al., compression artifacts that accompany image compression are emphasized by super-resolution image processing, which can degrade the quality of a super-resolution image. Here, main target of the compression artifacts in the present invention is banding effects appeared in large and smooth regions.

The present invention is directed to providing a method of producing a high-quality super-resolution image with less influence of the compression artifacts that accompany image compression.

SUMMARY OF THE INVENTION

According to an aspect of the present invention, an image processing method includes generating a second image by applying noise to a first image, as a first process, and generating a third image by upsampling the second image through a neural network, as a second process. The second image is generated by applying noise to the first image expressed in a second bit depth deeper than a first bit depth of the first image and then restoring the bit depth to the first bit depth.

Further features of the present invention will become apparent from the following description of embodiments with reference to the attached drawings.

DESCRIPTION OF THE EMBODIMENTS

Some embodiments of the present invention will be described in detail below with reference to the accompanying drawings. In the following drawings, like numbers refer to like members through the drawings, and redundant descriptions thereof will be omitted.

Before specifically describing the embodiments, the summary of the embodiments will be described. Each embodiment relates to a method of providing a high-quality super-resolution image through DL super-resolution image processing with less influence of the compression artifacts that accompany image compression. DL uses a neural network (artificial neural network) in super-resolution image processing (upsampling processing).

Figure 10:
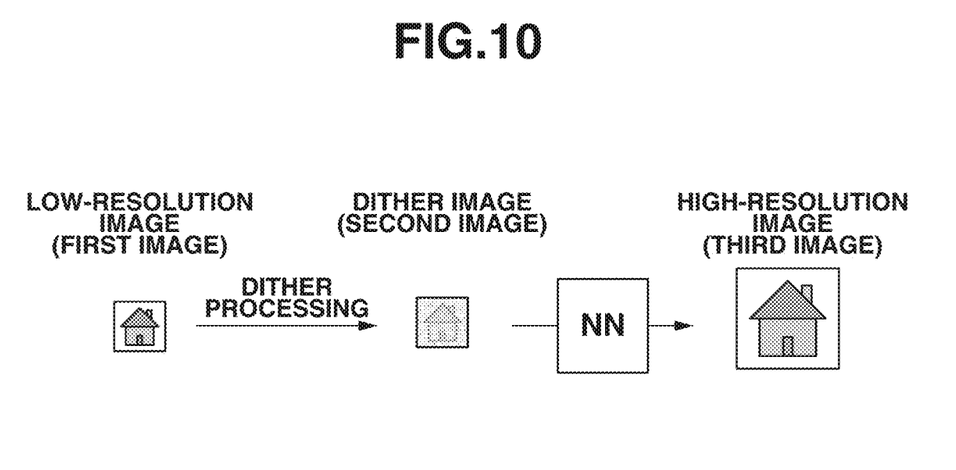
FIG. 10 is a conceptual view illustrating image processing according to the embodiments of the present invention.

An overview of image processing according to each embodiment will be described with reference to FIG. 10.

In each embodiment, first, a low-resolution image (first image) undergoes dither processing, which generates a dither image (second image). A low-resolution image is an image that is generated by the high-quality image undergoing downsampling by the area-average method and then Joint Photographic Experts Group (JPEG) compression. The low-resolution image is a compressed image and includes compression artifacts such as banding effects. According to the present specification, dither processing refers to applying noise components to an image. Noise components may be components that produce fluctuations in image signal values. Examples of noise components include random noise prescribed in a predetermined distribution and patterns generated by combining one or higher frequencies. The dither processing may include bit depth adjustment (described below).

Then, the dither image undergoes super-resolution image processing (upsampling processing) through a neural network (NN in FIG. 10), which generates an image (third image). The neural network has been trained to convert an image generated by dither processing on the low-resolution training image into a corresponding high-resolution training image.

Image processing according to each embodiment has a characteristic of performing super-resolution image processing on an image generated by dither processing on a low-resolution image through a neural network. Dither processing on a low-resolution image enables reduction of the influence of banding effects appeared in the low-resolution image with irreversible (lossy) image compression. In addition, the neural network pre-trained to convert an image generated by dither processing on a low-resolution training image into a high-quality training image reduces the influence of noise applied in the dither processing and that of banding effects that have not been removed by the dither processing. Thus, the influence of the compression artifacts with image compression is reduced, providing a high-quality super-resolution image.

An image processing system according to a first embodiment of the present invention will be described. In the present embodiment, the image processing system trains the neural network and executes super-resolution image processing using the trained neural network.

Figure 2:
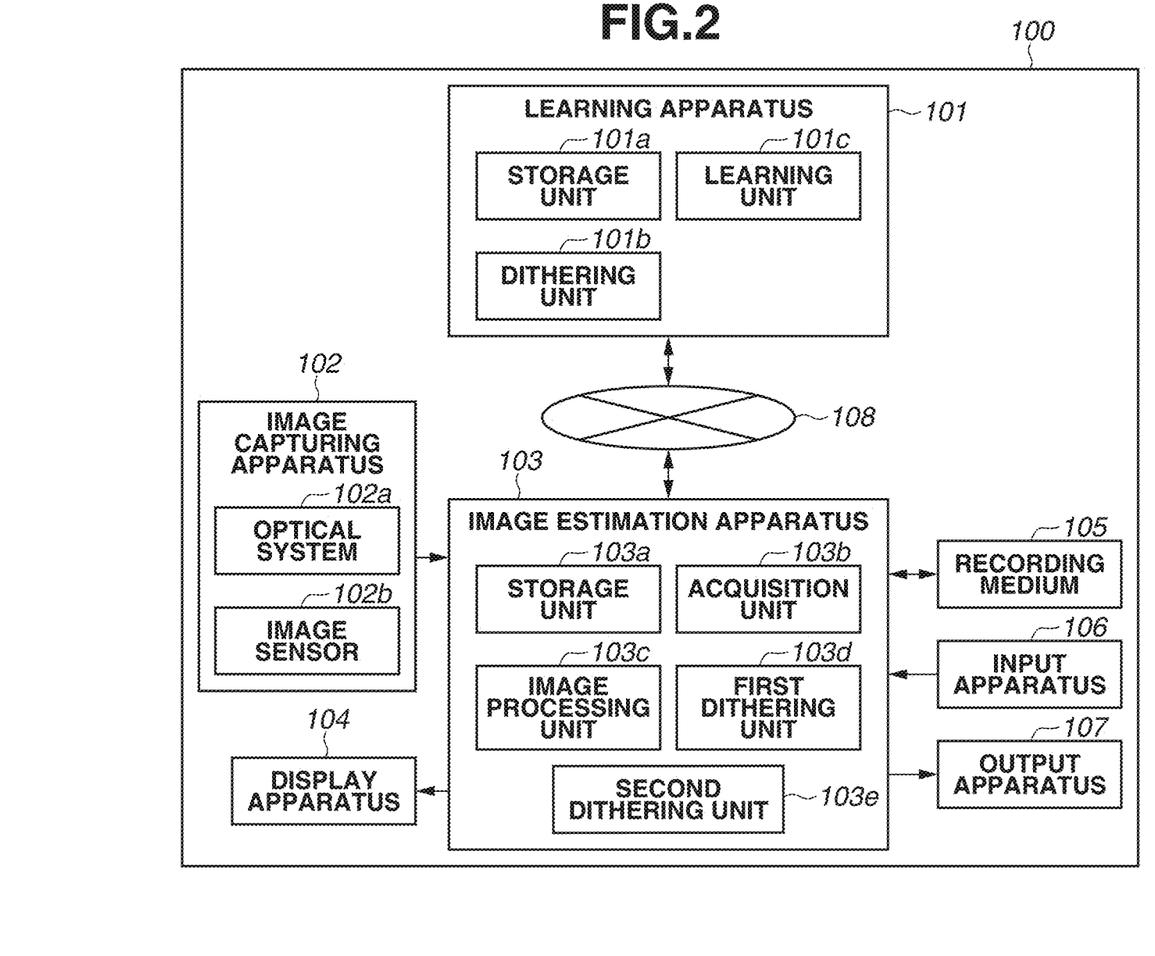
FIG. 2 is a block diagram illustrating an image processing system according to the first embodiment.
Figure 3:
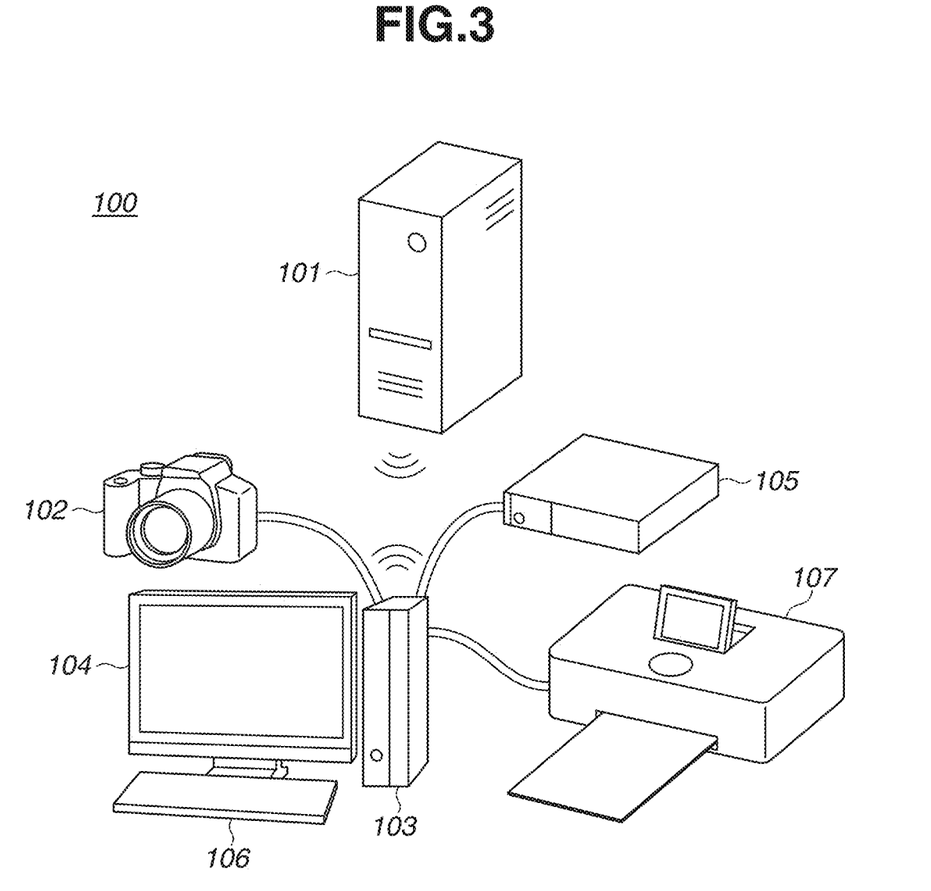
FIG. 3 illustrates an appearance of the image processing system according to the first embodiment.

FIG. 2 is a block diagram illustrating an image processing system 100 according to the present embodiment. FIG. 3 illustrates an appearance of the image processing system 100. The image processing system 100 includes a learning apparatus (image processing apparatus) 101, an image capturing apparatus 102, an image estimation apparatus (image processing apparatus) 103, a display apparatus 104, a recording medium 105, an input apparatus 106, an output apparatus 107, and a network 108.

The learning apparatus 101 includes a storage unit 101a, a dithering unit (generation unit) 101b, and a learning unit (processing unit) 101c.

The image capturing apparatus 102 includes an optical system 102a and an image sensor 102b. The optical system 102a collects light incident on the image capturing apparatus 102 from the subject space. The image sensor 102b receives (photoelectrically converts) an optical image (subject image) formed via the optical system 102a to acquire a captured image. The image sensor 102b is, for example, a Charge Coupled Device (CCD) sensor or a Complementary Metal-Oxide Semiconductor (CMOS) sensor. Captured images acquired by the image capturing apparatus 102 include blurred portions due to aberration or diffraction of the optical system 102a and pixel aperture deterioration and noise caused by the image sensor 102b.

The image estimation apparatus 103 includes a storage unit 103a, an acquisition unit 103b, an image processing unit (a processing unit) 103c, a first dithering unit (a generation unit) 103d, and a second dithering unit 103e. The image estimation apparatus 103 acquires the captured image and performs super-resolution image processing on the capture image to generate an estimation image (an output image). The super-resolution image processing uses a neural network. Weight of the neural network is read from the storage unit 103a. The weight (weight information) results from the learning by the learning apparatus 101. The image estimation apparatus 103 reads the weight information from the storage unit 101a via the network 108 and then stores the weight information in the memory 103a. The weight information to be stored may be a numerical value of the weight itself or form in an encoded format. Training the neural network and super-resolution image processing using the trained neural network with obtaining weight will be described below.

The output image is output to at least one of the display apparatus 104, the recording medium 105, or the output apparatus 107. The display apparatus 104 is, for example, a liquid crystal display or a projector. The recording medium 105 is, for example, a semiconductor memory, a hard disk, or a server on the network. The output apparatus 107 is, for example, a printer. The user is able to confirm the image currently being processed on the display apparatus 104 and edit the image with the input apparatus 106. The image estimation apparatus 103 has the functionality of performing development processing and other image processing as appropriate.

Figure 1:
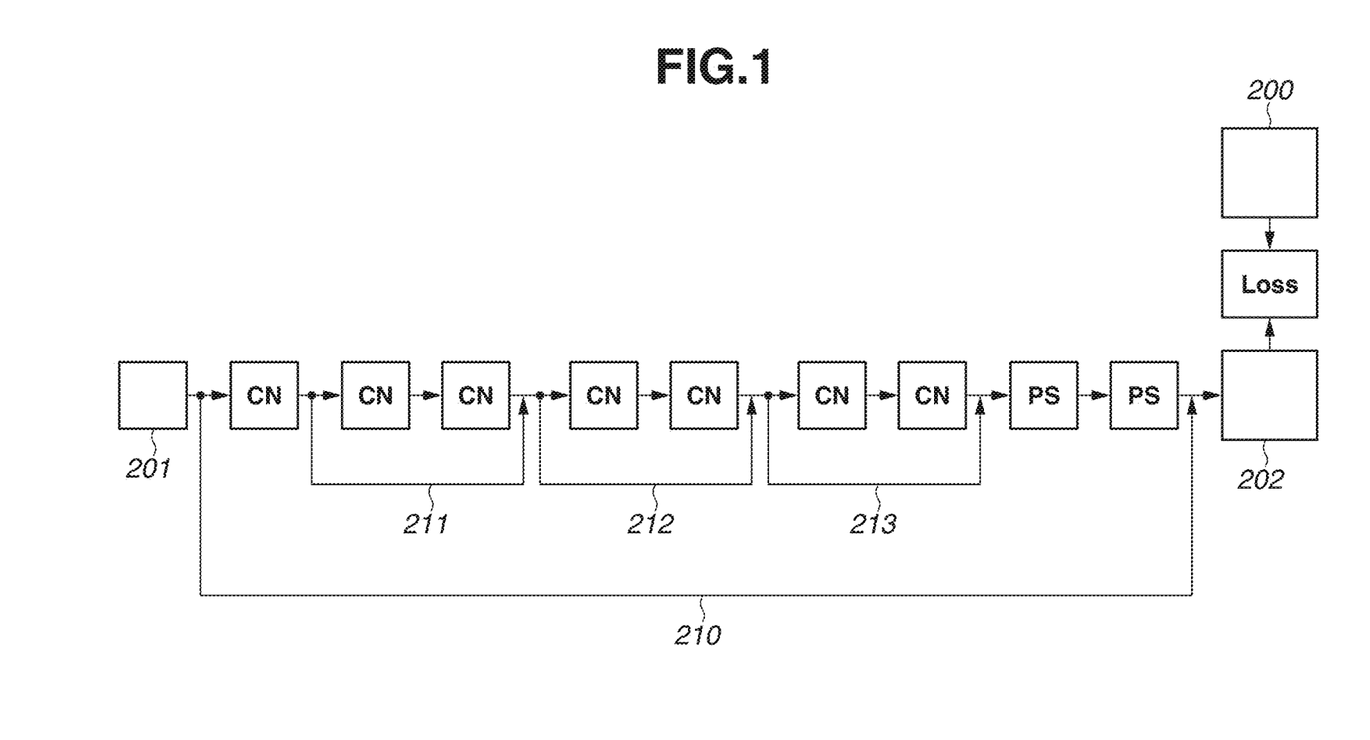
FIG. 1 illustrates a procedure of training a neural network according to a first embodiment.
Figure 4:
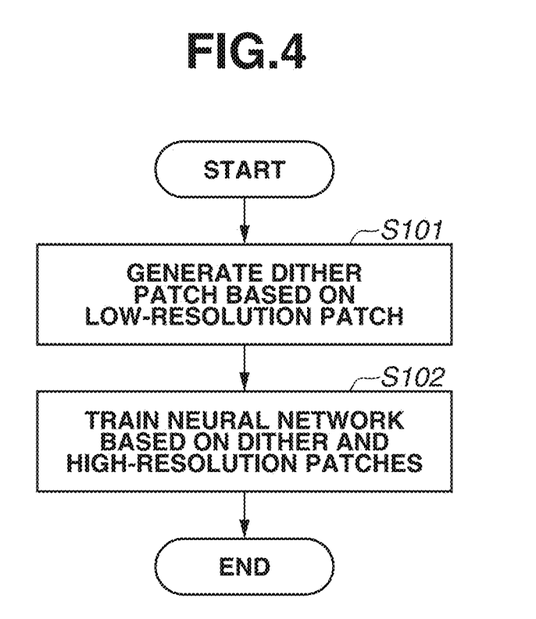
FIG. 4 is a flowchart illustrating weight training according to the first embodiment.

A method of training the neural network and obtaining its weight (a method of producing a trained model) performed by the learning apparatus 101 according to the present embodiment will be described with reference to FIGS. 1 and 4. FIG. 1 illustrates a procedure of weight training of the neural network. FIG. 4 is a flowchart illustrating the training neural network. The processing in each step in FIG. 4 is performed mainly by the dithering unit 101b and the learning unit 101c.

In step S101 in FIG. 4, the dithering unit 101b generates a dither patch (a second training image) based on a low-resolution patch (a first training image).

A high-resolution patch corresponding to the low-resolution patch includes an identical subject. The low-resolution patch has a number of pixels smaller than the high-resolution patch. In addition, the low-resolution patch and the dither patch corresponding to the low-resolution patch are images including the identical subject and having the same number of pixels.

A patch image refers to an image having a predetermined number of pixels. Examples of patches include a low-resolution patch having 64×64 pixels and a corresponding high-resolution patch having 256×256 pixels.

The low-resolution patch according to the present embodiment is produced by the corresponding high-resolution patch (a third training image) undergoing downsampling by the area average method and then JPEG compression with Quality-Factor (Q-Factor) 80. Q-Factor represents JPEG compression quality and takes values from 1 to 100. A Q-Factor closer to 1 provides a lower compression quality with which compression artifacts such as banding effects become noticeable. However, the method of acquiring a low-resolution patch is not limited thereto. Examples of applicable downsampling methods include bi-cubic interpolation and nearest neighbor interpolation, instead of the area average method. Examples of applicable compression standards for producing a low-resolution patch include JPEG2000, as well as JPEG, and, when moving image data is used as an input, further include Moving Picture Experts Group (MPEG) and H.264.

A dither patch according to the present embodiment is produced through dither processing on the corresponding low-resolution patch.

The dither processing according to the present embodiment refers to the processing of representing a low-resolution patch having an 8-bit color depth with a 64-bit color depth, applying 64-bit noise, and then restoring the bit depth to an 8-bit color depth. The noise to be applied in the dither processing is Gaussian noise with a mean value of 0 and a standard deviation of 0.02. The noise to be applied here is defined based on information about the compression quality (or a compression ratio) of the low-resolution patch. Banding effects become more noticeable with lower compression quality levels (or higher compression ratio) in generation of a low-resolution patch. Thus, a larger amount of noise in the dither processing is applied with a lower compression quality level (or a higher compression ratio).

For example, using the Q-Factor value as information about a compression quality level (or compression ratio), the low-resolution image has more noticeable banding effects if the Q-Factor value is smaller. Thus, with a smaller Q-Factor value, a larger amount of noise is applied to the low-resolution image to generate a dither image with the influence of banding effects reduced. In the above description, the standard deviation of Gaussian noise is set to 0.02 when the Q-Factor value of the low-resolution patch is 80. However, for example, if the low-resolution patch has a lower quality (e.g., Q-Factor of 60), a larger amount of noise may be applied in the dither processing. More specifically, the Gaussian noise to be applied in the dither processing may have a larger standard deviation (e.g., 0.04). Applying a larger amount of noise to the low-resolution patch having a lower quality level enables reduction of the influence of banding effects in the low-resolution patch.

The dither processing according to the present embodiment applies noise after increasing the bit depth of the low-resolution patch, and then restores the bit depth to the original one. However, the dither processing according to the present invention is not limited thereto. The dither processing may simply apply noise to the low-resolution patch.

In step S102, the learning unit 101c trains the neural network based on the dither patch and the corresponding high-resolution patch.

The learning unit 101c inputs a dither patch 201 to the neural network illustrated in FIG. 1 to generate an estimation patch 202. The estimation patch 202 is the super-resolved dither patch 201. Ideally, the estimation patch 202 is identical to the high-resolution patch 200.

The learning unit 101c updates the weight (weight information) of the neural network based on the error between the estimation patch 202 and the high-resolution patch 200. In the present embodiment, the weight update involves error back propagation. In addition, mini-batch learning is used that produces a plurality of high-resolution patches 200 and the error between each of the high-resolution patches 200 and the corresponding one of the estimation patches 202, and then updates the weight. However, the above processing according to the present invention is not limited thereto. For example, batch learning and online learning are applicable.

Although, in the embodiment, the training of the neural network is terminated when the number of iterations (updating the weight) reaches a predetermined value, the invention is not limited to this termination condition. The learning unit 101c may determine whether to continue the learning, for example, according to whether the variation in the updated weight is smaller than a predetermined value. When the learning unit 101c determines that the training of the neural network is not terminated, the learning unit 101c acquires a plurality of new high-resolution patches 200 and a plurality of new dither patches 201, and then continues the training.

In the present embodiment, Mean Square Error (MSE) is used as a loss function that evaluates the error between the estimation patch 202 and the high-resolution patch 200. However, the loss function is not limited thereto. For example, Mean Absolute Error (MAE), Huber Loss, and Adversarial Loss are also applicable. Adversarial Loss refers to a loss function that is set to prevent a separately prepared image recognition neural network from recognizing the estimation patch 202 as a pseudo patch generated by the neural network. Training using Adversarial Loss is referred to as Generative Adversarial Network (GAN). It is known that a neural network that has been trained based on GAN provides an estimation image with more natural textures.

The CNs in FIG. 1 represent convolution layers. Each CN performs convolution of an input and a filter, calculates a sum with a bias, and nonlinear-converts the result by using an activation function. Any component of the filter and any bias initial value are used, and are determined by a random number in the present embodiment. The activation function may be, for example, Rectified Linear Unit (ReLU) or a sigmoid function.

The output of each layer other than the final layer is referred to as a feature map. Skip connections 211, 212, and 213 combine feature maps output from discontinuous layers. In other words, a skip connection is used to combine a feature map to be input to one or more continuous convolution layers and a feature map output from the one or more continuous convolution layers. Examples of methods of combining feature maps include a method of obtaining a sum for each element and a method of performing concatenation in the channel direction. In the present embodiment, the method of obtaining a sum for each element.

A skip connection 210 may be added. This is a path to generate the estimation patch 202 by combining the result (residual) of the processing on the dither patch 201 in each layer of the neural network with the dither patch 201 enlarged by interpolation. The combination by the skip connection 210 is performed not by concatenation in the channel direction but by element-wise summation.

The PSs in FIG. 1 represent Pixel Shuffle layers. Each PS sorts (or rearranges) elements of a low-resolution feature map to generate a high-resolution feature map. For example, each PS sorts 64×64×64 pixel low-resolution feature maps to generate a 128×128×16 pixel high-resolution feature map. The size of each feature map is represented by length× width×depth (channel). Feature maps produced by the PSs may undergo further convolution to adjust the number of channels of the feature maps. Pixel Shuffle is used to increase the resolution of feature maps in the present embodiment, but the method is not limited thereto. For example, deconvolution or transposed convolution, and interpolation are also applicable.

The neural network may have branching exits to output a plurality of estimation patches 202. This entails a skip connection prepared for each branch and definition of a loss function for each of the estimation patches 202.

Figure 5:
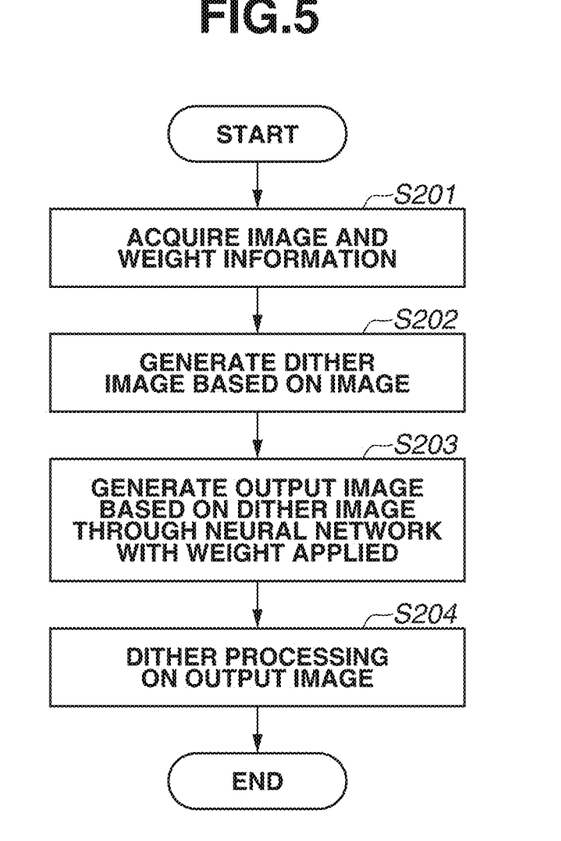
FIG. 5 is a flowchart illustrating output image generation according to the first embodiment.

The generation of an estimation image (an output image) performed by the image estimation apparatus 103 according to the present embodiment will be described with reference to FIG. 5. FIG. 5 is a flowchart illustrating the output image generation. Each step processing in FIG. 5 is mainly performed by the acquisition unit 103b, the image processing unit 103c, the first dithering unit 103d, and the second dithering unit 103e of the image estimation apparatus 103.

In step S201, the acquisition unit 103b acquires a processing target image and the weight of the neural network. According to the present embodiment, the image is a captured image transmitted from the image capturing apparatus 102 or a thumbnail image contained in the captured image. The thumbnail image is a sample image downsampled to provide high visibility in display of the captured image. As with the processing in step S101 in FIG. 4, the image has undergone downsampling by the area average method and then JPEG-compression with Q-Factor 80. The weight information is transmitted from the learning apparatus 101 and then stored in the storage unit 103a.

In step S202, the first dithering unit 103d performs the dither processing on the image acquired in step S201 to generate a dither image. The dither processing in step S202 is similar to that in step S101 in FIG. 4.

In step S203, the image processing unit 103c inputs the dither image generated in step S202 to the trained neural network with the obtained weight and then generate an output image. The output image is a high-resolution image converted from the image acquired in step S201. The configuration of the neural network used in step S203 is similar to that illustrated in FIG. 1.

When the neural network has branching exits as described above, a weighted summation of a plurality of generated output images results in a final output image (third image). For example, the image processing unit 103c may generate an output image with a greater super-resolved effect and an output image with a lesser super-resolved effect by using the neural network, and adjust the super-resolved effect with a weighted sum of these output images, producing an output image. An output image with a greater super-resolved effect can be generated through the training based on GAN using Adversarial Loss as a loss function. An output image with a lesser super-resolved effect can be generated through the training based on MSE as a loss function. The weight used for the weighted sum may be a predetermined weight stored in the storage unit 103a or a weight specified by the user.

In step S204, the second dithering unit 103e performs the dither processing on the generated output image based on the image capturing condition of the captured image. The image capturing condition is related to the noise of the captured image. The image capturing condition includes at least either information about the apparatus used in image capturing (the model of the camera and the interchangeable lens) or the International Organization for Standardization (ISO) sensitivity at the time of image capturing. The image capturing condition may further include the shutter speed and the aperture. Although noise to be applied in the dither processing is noise with statistical distribution suited to the image capturing condition, the invention is not limited thereto. For example, Gaussian noise of the standard deviation suited to the magnitude of the ISO sensitivity may be applied.

The processing in step S204 is additive processing performed as dither processing to obscure a small amount of banding effects remaining in the output image. If the output image produced in step S203 has a sufficient image quality, step S204 may be omitted.

The above-described configuration provides an image processing system that produces a high-quality super-resolution image with less influence of the compression artifacts that accompany image compression.

An image processing system according to a second embodiment of the present invention will be described. In the present embodiment, the image processing system also trains the neural network and executes super-resolution image processing using the trained neural network. The image processing system according to the present embodiment differs from the image processing system according to the first embodiment in that the image capturing apparatus acquires a captured image and performs super-resolution image processing on it.

Figure 6:
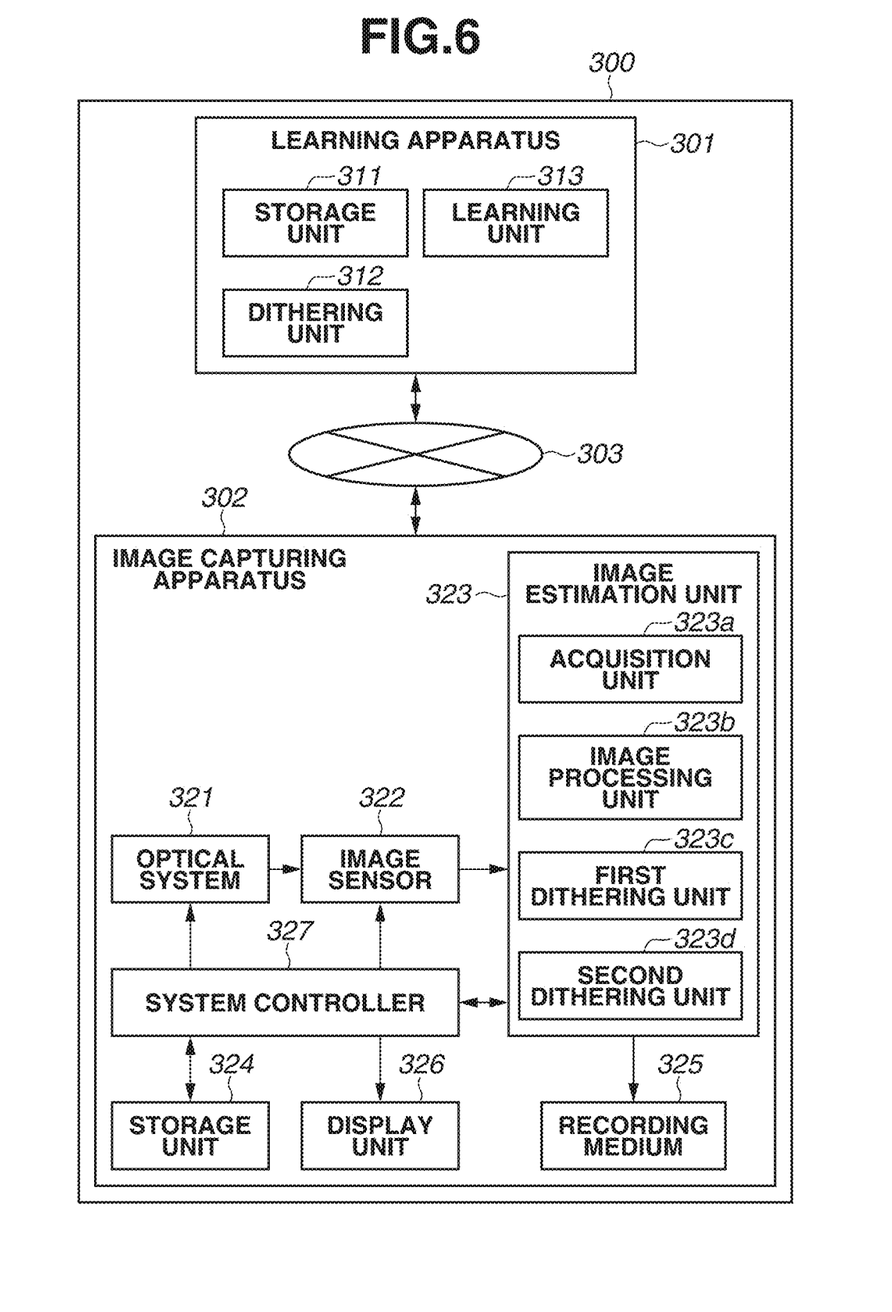
FIG. 6 is a block diagram illustrating an image processing system according to a second embodiment.
Figure 7:
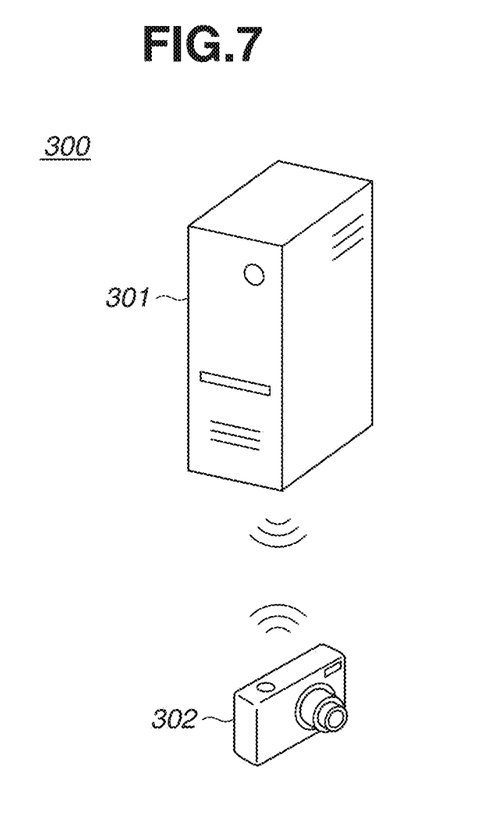
FIG. 7 illustrates an appearance of the image processing system according to the second embodiment.

FIG. 6 is a block diagram illustrating an image processing system 300 according to the present embodiment. FIG. 7 illustrates an appearance of the image processing system 300. The image processing system 300 includes a learning apparatus 301 and an image capturing apparatus 302 connected via a network 303 to each other. The learning apparatus 301 and the image capturing apparatus 302 may not be constantly connected to each other via the network 303.

The learning apparatus 301 includes a storage unit 311, a dithering unit (a generation unit) 312, and a learning unit (a processing unit) 313.

The image capturing apparatus 302 includes an optical system 321 and an image sensor 322. An image estimation unit 323 includes an acquisition unit 323a, an image processing unit (a processing unit) 323b, a first dithering unit (a generation unit) 323c, and a second dithering unit 323d. The image estimation unit 323 performs super-resolution image processing using the trained neural network with the obtained weight information in the storage unit 324 on a captured image, generating an image.

The training of the neural network performed by the learning apparatus 301 is similar to that according to the first embodiment. The weight information of the trained neural network is obtained by the learning apparatus 301 and then stored in storage unit 311.

The image capturing apparatus 302 reads the weight information from the storage unit 311 via the network 303 and then stores the weight information in the storage unit 324. The image above generated by the image estimation unit 323 is stored in the storage unit 324 or recorded in a recording medium 325. If a user issues an instruction for displaying the super-resolution image, the stored image is read and displayed on a display unit 326. The image estimation unit 323 may read the image recorded in the recording medium 325 and then perform super-resolution image processing on the image. The above-described processing is all performed by a system controller 327.

The generation of an estimation image (output image) performed by the image estimation unit 323 according to the present embodiment will be described. The procedure of super-resolution image processing is substantially the same as the procedure according to the first embodiment in FIG. 5, and a redundant flowchart will be omitted. Each step processing of super-resolution image processing is mainly performed by the acquisition unit 323a, the image processing unit 323b, the first dithering unit 323c, and the second dithering unit 323d of the image estimation unit 323.

In step S201, the acquisition unit 323a acquires an image and the weight information for the neural network. The image is a captured image acquired by the image capturing apparatus 302 or a thumbnail image contained in the captured image, stored in the storage unit 324. As with the processing in step S101 in FIG. 4, the image has undergone downsampling by the area average method and then JPEG-compression with Q-Factor 80. The weight information is transmitted from the learning apparatus 301 and then stored in the storage unit 324.

The processing in steps S202 to S204 is similar to that in steps S202 to S204 according to the first embodiment, and detailed descriptions thereof will be omitted. The first dithering unit 323c generates a dither image from the image based on the Q-Factor value of the image. Then, the image processing unit 323b generates an output image based on the dither image by using the neural network having the acquired weight. Finally, upon reception of a request from the user, the second dithering unit 323c performs the dither processing on the output image based on the image capturing condition.

The above-described configuration provides a high-quality super-resolution image with less influence of the compression artifacts that accompany image compression.

An image processing system according to a third embodiment of the present invention will be described.

In the present embodiment, the image processing system also trains the neural network and executes super-resolution image processing using the trained neural network. The image processing system according to the present embodiment differs from those according to the first and second embodiments in that a processing apparatus (computer) transmits an image processing request to an image estimation apparatus and receives an output image processed by the image estimation apparatus from the image estimation apparatus.

Figure 8:
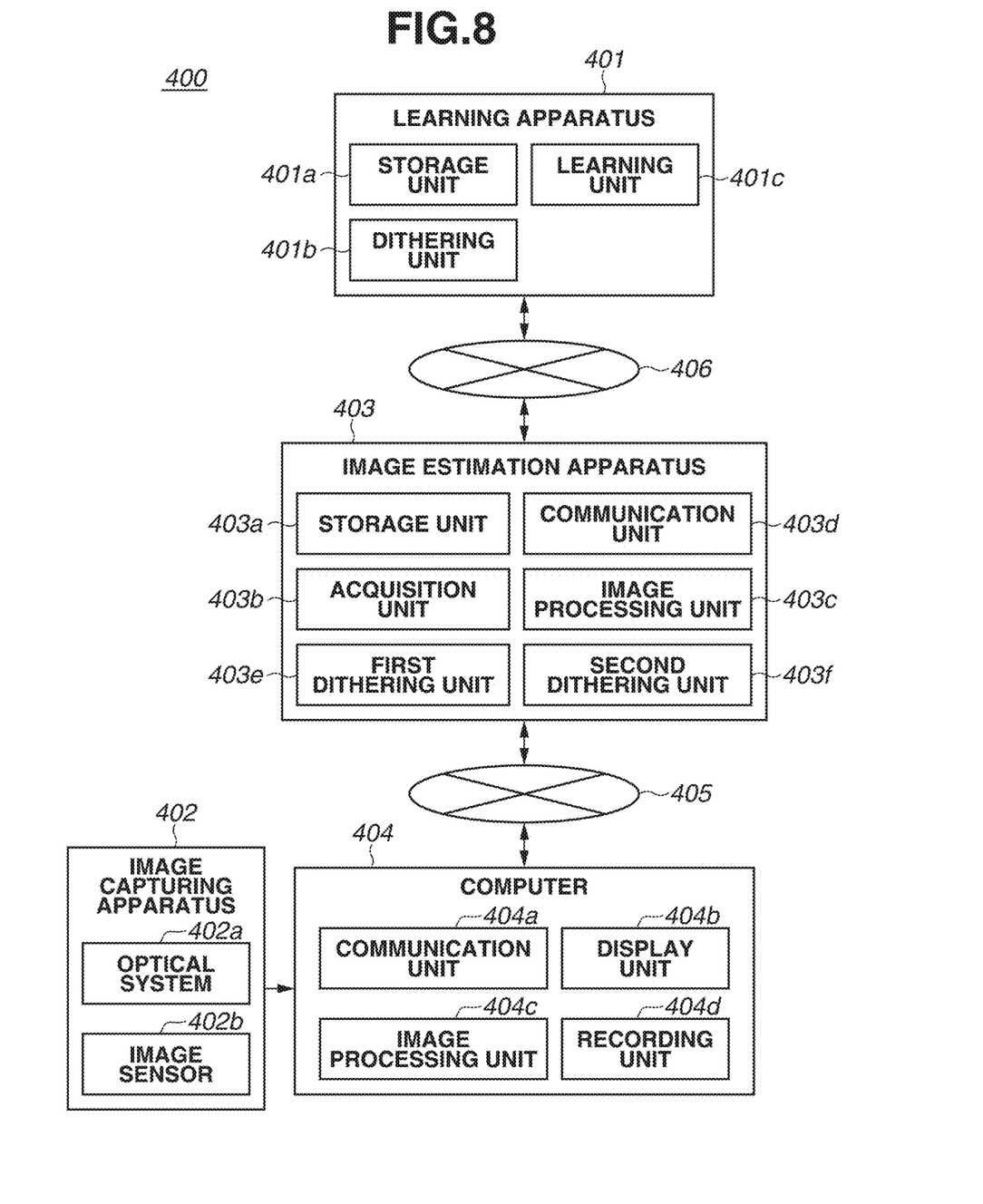
FIG. 8 is a block diagram illustrating an image processing system according to a third embodiment.

FIG. 8 is a block diagram illustrating an image processing system 400 according to the present embodiment. The image processing system 400 includes a learning apparatus 401, an image capturing apparatus 402, an image estimation apparatus 403, and a processing apparatus (a computer) 404. The learning apparatus 401 and the image estimation apparatus 403 are, for example, servers. The computer 404 is, for example, a user terminal (a personal computer or smart phone). The computer 404 is connected to the image estimation apparatus 403 via a network 405. The image estimation apparatus 403 is connected to the learning apparatus 401 via a network 406.

More specifically, the computer 404 and the image estimation apparatus 403 are configured to communicate with each other, and the image estimation apparatus 403 and the learning apparatus 401 are configured to communicate with each other. The computer 404 is a first apparatus, and the image estimation apparatus 403 is a second apparatus.

The configuration of the learning apparatus 401 is similar to that of the learning apparatus 101 according to the first embodiment, and redundant descriptions thereof will be omitted. The configuration of the image capturing apparatus 402 is similar to that of the image capturing apparatus 102 according to the first embodiment, and redundant descriptions thereof will be omitted.

The image estimation apparatus 403 includes a storage unit 403a, an acquisition unit 403b, an image processing unit (a processing unit) 403c, a communication unit (a reception unit) 403d, a first dithering unit (a generation unit) 403e, and a second dithering unit 403f. The storage unit 403a, the acquisition unit 403b, the image processing unit 403c, the first dithering unit 403e, and the second dithering unit 403f each are similar to the corresponding one of the units of the image estimation apparatus 103 according to the first embodiment. The communication unit 403d has the functionality of receiving a request transmitted from the computer 404, and the functionality of transmitting an estimation image (an output image) generated by the image estimation apparatus 403 to the computer 404.

The computer 404 includes a communication unit (a transmission unit) 404a, a display unit 404b, an image processing unit 404c, and a recording unit 404d. The communication unit 404a has the functionality of transmitting a request for causing the image estimation apparatus 403 to perform processing on a captured image to the image estimation apparatus 403, and the functionality of receiving the output image processed by the image estimation apparatus 403. The display unit 404b has the functionality of displaying various kinds of information. Examples of information displayed by the display unit 404b include a captured image to be transmitted to the image estimation apparatus 403 and an output image received from the image estimation apparatus 403. The image processing unit 404c has the functionality of performing additional processing on an output image received from the image estimation apparatus 403. The recording unit 404d records a captured image acquired from the image capturing apparatus 402 and an output image received from the image estimation apparatus 403.

The training of the neural network performed by the learning apparatus 401 is substantially the same as the training according to the first embodiment. The weight information of the trained neural network is obtained by the learning apparatus 401 and then stored in the storage unit 401a. The image estimation apparatus 403 retrieves the weight information from the storage unit 401a via the network 406 and then stores the weight information in the storage unit 403a.

Figure 9:
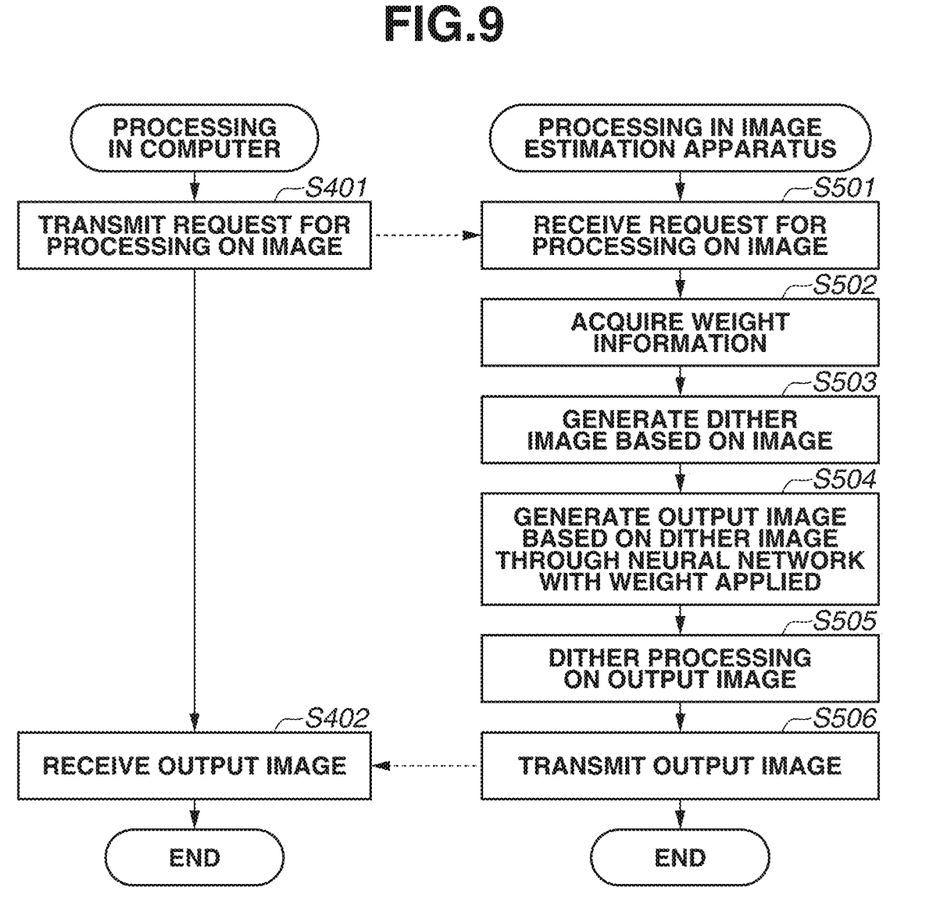
FIG. 9 is a flowchart illustrating output image generation according to the third embodiment.

The generation of an estimation image (an output image) performed by the image estimation apparatus 403 according to the present embodiment will be described with reference to FIG. 9. The super-resolution image processing is started upon issuance of an image processing start instruction by a user via the computer 404. The operation of the computer 404 will be described.

In step S401, the computer 404 transmits a request for processing on the image to the image estimation apparatus 403. The method of transmitting a processing target image to the image estimation apparatus 403 is not limited to this. For example, the image may be uploaded to the image estimation apparatus 403 at the same time as or before the processing in step S401. An image stored in a server different from the image estimation apparatus 403 may be a processing target image. In step S401, the computer 404 may transmit identification (ID) information for authenticating the user together with a request for processing on the image. According to the present embodiment, the processing target image is a captured image acquired by the image capturing apparatus 402 or a thumbnail image contained in the captured image. As with the processing in step S101 in FIG. 4, the image has undergone downsampling by the area average method and then JPEG compression with Q-Factor 80.

In step S402, the computer 404 receives an output image generated in the image estimation apparatus 403. Super-resolution image processing is performed on the image, generating the output image.

The operation of the image estimation apparatus 403 will be described.

In step S501, the image estimation apparatus 403 receives the processing request transmitted from the computer 404. The image estimation apparatus 403 determines to be instructed to perform super-resolution image processing on a specific image, and the processing proceeds to step S502.

In step S502, the image estimation apparatus 403 acquires the weight information. The weight information refers to information obtained by a similar method to the method according to the first embodiment (FIG. 4). The image estimation apparatus 403 may acquire the weight information from the learning apparatus 401, or acquire the weight information that has been stored in the storage unit 403a after being acquired from the learning apparatus 401.

The processing in steps S503 to S505 is similar to that in steps S202 to S204 according to first embodiment, respectively.

In step S506, the image estimation apparatus 403 transmits the output image to the computer 404.

The above-described configuration enables an image processing system to provide a high-quality super-resolution image with less influence of the compression artifacts that accompany image compression. According to the third embodiment, all the computer 404 here does is make a request for processing on a specific image. The actual image processing is performed by the image estimation apparatus 403. Thus, use of the computer 404 as a user terminal reduces the processing load on the user terminal. This enables the user terminal to obtain a high-quality super-resolution image with a low processing load.

Other Embodiments

The present invention can also be implemented by supplying a program for implementing at least one of the functions according to the above-described embodiments to a system or apparatus via a network or storage medium, and then by reading and running the program by at least one processor in a computer of the system or apparatus. Further, the present invention can also be implemented by a circuit (for example, an application specific integrated circuit (ASIC)) for implementing at least one function.

While the present invention has specifically been described based on the above-described embodiments, the present invention is not limited thereto but can be modified and changed in diverse ways within the ambit of the appended claims.

According to the present invention, a method is provided of providing a high-quality image with less influence of compression artifacts that accompany image compression.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2020-164699, filed Sep. 30, 2020, which is hereby incorporated by reference herein in its entirety.

What is claimed is:

1. An image processing method comprising:
generating a second image by applying noise to a first image, as a first process; and
generating a third image by upsampling the second image through a neural network, as a second process,
wherein the second image is generated by applying noise to the first image expressed in a second bit depth higher than a first bit depth of the first image and then restoring the bit depth to the first bit depth.

2. The image processing method according to claim 1, wherein the first image is an irreversibly compressed image.

3. The image processing method according to claim 1, wherein the noise used in the first process is determined based on information about an image compression quality or compression ratio of the first image.

4. The image processing method according to claim 1, further comprising generating a fourth image by applying noise to the third image, as a third process.

5. The image processing method according to claim 4, wherein the noise used in the third process is determined based on an image capturing condition of the first image.

6. The image processing method according to claim 5, wherein the image capturing condition includes at least either one of information about an apparatus used in image capturing or information about the International Organization for Standardization (ISO) sensitivity at the time of image capturing.

7. The image processing method according to claim 1, wherein, in the second process, a plurality of images is generated by upsampling the second image, and
wherein the third image is generated by obtaining a weighted sum of the plurality of images.

8. The image processing method according to claim 1, wherein, by using a second training image generated by applying noise to a first training image, and a third training image having a higher resolution than the first training image and including a subject identical to a subject on the first training image, the neural network is trained so that the second training image is converted into a high-resolution training image.

9. A nonvolatile storage medium storing a program for causing a computer to carry out the image processing method according to claim 1.

10. An image processing apparatus comprising:
a generation unit configured to generate a second image by applying noise to a first image; and
a processing unit configured to generate a third image by upsampling the second image through a neural network,
wherein the second image is generated by applying noise to the first image expressed in a second bit depth higher than a first bit depth of the first image and then restoring the bit depth to the first bit depth.

11. A method of producing a trained model, the method comprising:
generating a second training image by applying noise to a first training image, as a first process; and
training a neural network for converting the second training image into a high-resolution training image by using a third training image having a higher resolution than the first training image and including a subject identical to a subject on the first training image, as a second process,
wherein the second training image is generated by applying noise to the first training image expressed in a second bit depth higher than a first bit depth of the first training image and then restoring the bit depth to the first bit depth.

12. A learning apparatus comprising:
a generation unit configured to generate a second training image by applying noise to a first training image; and
a processing unit configured to train a neural network for converting the second training image into a high-resolution training image by using a third training image having a higher resolution than the first training image and including a subject identical to a subject on the first training image,
wherein the second training image is generated by applying noise to the first training image expressed in a second bit depth higher than a first bit depth of the first training image and then restoring the bit depth to the first bit depth.

13. An image processing system comprising:
a first apparatus; and
a second apparatus to communicate with the first apparatus,
wherein the first apparatus comprises a transmission unit configured to transmit a request for causing the second apparatus to perform processing on a first image, wherein the second apparatus comprises:
  a generation unit configured to generate a second image by applying noise to the first image; and
  a processing unit configured to generate a third image by upsampling the second image through a neural network, and
wherein the second image is generated by applying noise to the first image expressed in a second bit depth higher than a first bit depth of the first image and then restoring the bit depth to the first bit depth.

* * * * *